US011205347B2

(12) United States Patent
Stählin et al.

(10) Patent No.: US 11,205,347 B2
(45) Date of Patent: Dec. 21, 2021

(54) METHOD AND ELECTRONIC DEVICE FOR ASCERTAINING AN EGO POSITION

(71) Applicants: Continental Teves AG & Co. oHG, Frankfurt am Main (DE); Continental Automotive Systems, Inc., Auburn Hills, MI (US)

(72) Inventors: Ulrich Stählin, Rochester, MI (US); Sebastian Strunck, Niedernhausen (DE)

(73) Assignees: CONTINENTAL TEVES AG & CO. OHG, Frankfurt am Main (DE); CONTINENTAL AUTOMOTIVE SYSTEMS, INC., Auburn Hills, MI (US)

( * ) Notice: Subject to any disclaimer, the term of this patent is extended or adjusted under 35 U.S.C. 154(b) by 239 days.

(21) Appl. No.: 16/567,131

(22) Filed: Sep. 11, 2019

(65) Prior Publication Data

US 2021/0074151 A1 Mar. 11, 2021

(51) Int. Cl.
| | |
|---|---|
| *G08G 1/00* | (2006.01) |
| *G08G 1/0962* | (2006.01) |
| *G08G 1/04* | (2006.01) |
| *G08G 1/056* | (2006.01) |
| *G08G 1/005* | (2006.01) |

(52) U.S. Cl.
CPC ............. *G08G 1/0962* (2013.01); *G08G 1/04* (2013.01); *G08G 1/056* (2013.01); *G08G 1/005* (2013.01)

(58) Field of Classification Search
CPC ........ G08G 1/0962; G08G 1/04; G08G 1/056; G08G 1/005; G01S 5/021; G01S 19/46
See application file for complete search history.

(56) References Cited

U.S. PATENT DOCUMENTS

| | | | |
|---|---|---|---|
| 2020/0413264 A1* | 12/2020 | Han | H04W 12/68 |
| 2021/0023992 A1* | 1/2021 | Broggi | G02B 27/0101 |

\* cited by examiner

*Primary Examiner* — Ian Jen
(74) *Attorney, Agent, or Firm* — RatnerPrestia

(57) ABSTRACT

A method for ascertaining an ego position of an electronic device, having the steps: ascertaining an ego position of the electronic device by a position-detecting apparatus of the electronic device, ascertaining, by a computing apparatus for processing the data of the electronic device, a position of a road user using positional information comprising a received vehicle-to-X message in respect of cooperative road user recognition, ascertaining, by the computing apparatus or a further computing apparatus for processing data, a distance between the ascertained ego position and the position ascertained using the received positional information, correcting the ascertained ego position using the positional information to form a corrected ego position if the distance is less than or equal to a threshold value. An electronic device, the use of the electronic device as well as a corresponding system as also disclosed.

18 Claims, 3 Drawing Sheets

METHOD AND ELECTRONIC DEVICE FOR ASCERTAINING AN EGO POSITION

FIELD OF THE INVENTION

The present invention relates to a method for ascertaining an ego position, an electronic device, the use of the electronic device as well as a corresponding system.

BACKGROUND OF THE INVENTION

It is possible, by means of vehicle-to-X communication (V2X communication), for road users to exchange information about their actual positions with one another and, on the basis of this information, to be able to set the respective ego position in relation to a received position. In principle, to this end, a position detected by means of global navigation satellite system (GNSS) can be communicated. A margin between a received GNSS position of a further road user and an ego position represents the relative positioning of this road user in question. In particular in the case of impaired receiving conditions of the GNSS signal, information regarding driving dynamics, ascertained for example by sensors, can be used to improve the ego position. Usually, this is detected by means of acceleration sensors and/or yaw sensors. 2Q This approach is generally also known as coupled navigation or "dead reckoning". Using the time or the distance travelled, the errors in sensor detection are added up, which leads to an increasing inaccuracy when detecting position and ultimately in substance leads to the purpose of unsuitable positional information if no new position detection by means of GNSS has taken place or is possible.

SUMMARY OF THE INVENTION

An aspect of the invention is a means which makes possible an improved position detection or an increased accuracy of the ascertained positional information.

An aspect of the invention describes a method for ascertaining an ego position of an electronic device, having the steps:
  ascertaining an ego position of the electronic device by means of a position-detecting apparatus of the electronic device,
  ascertaining, by means of a computing apparatus for processing the data of the electronic device, a position of a road user using positional information comprising a received vehicle-to-X (V2X) message in respect of cooperative road user recognition,
  ascertaining, by means of the computing apparatus or a further computing apparatus for processing data, a distance between the ascertained ego position and the position ascertained using the received positional information,
  correcting the ascertained ego position using the positional information to form a corrected ego position if the distance is less than or equal to a threshold value.

The concept forming the basis of an aspect of the invention is that the V2X messages used within the meaning of an aspect of the invention do not represent any dedicated location or positioning messages or information, such as for example in real-time kinematics (RTK) or a differential global positioning system (DGPS). According to an embodiment, instead of these, V2X messages are used, the original purpose of which is cooperative road user recognition. For this purpose, these serve to inform road users of an affected spatial environment about the presence and/or position at least of a respective other road user. This can be of particular relevance in terms of safety to road users who do not broadcast their own position periodically by means of a communication device provided for this purpose. Using V2X messages in respect of cooperative road user recognition, these road users can also be detected and other road users informed of their presence. An example of such a V2X message for cooperative road user recognition is colloquially known as "Ghost BSM", because here the communication device forwards cyclical messages with information affecting the other road user and thus broadcasts these messages almost on his behalf. The road user thus does not broadcast messages himself, instead the communication device used by another road user or the infrastructure broadcasts these messages, but fills these with information affecting the road user.

V2X messages for cooperative road user recognition are usually sent out by an infrastructure apparatus, such as for example a so-called intelligent infrastructure apparatus or intelligent hybridisation. Frequently, items of infrastructure apparatus performing this task comprise at least one so-called road side unit for this purpose. The infrastructure apparatus has communication and data-processing means to this effect suitable for vehicle-to-X communication. Such an infrastructure apparatus further has at least one detecting apparatus for detecting road users. For example, items of detecting apparatus of this type are cameras, radar sensors and/or lidar sensors.

Thus if a road user approaches such an infrastructure apparatus, this can be detected by means of at least one detecting apparatus of the infrastructure apparatus. On this basis, the position of the road user can be detected by a computing apparatus of the infrastructure apparatus. The positional information for ascertaining the position of the road user is then supplied for cooperative road user recognition to a V2X message to be broadcast. The same also applies to further road users located in the detection range of the detecting apparatus.

V2X messages for cooperative road user recognition which have been sent out can be received by road users in the receiving range who are capable of vehicle-to-X communication, wherein the positional information for ascertaining a position of a road user included in such a V2X message likewise itself comprises the position of a receiving road user, where this has been detected. However, allocation does not necessarily take place, with the result that the receiving road user possibly does not have any information about whether or what of the received positional information in respect of present road users relates to positional information relevant to himself and what is to be allocated exclusively to other road users. The positional information is thus initially undefined in respect of a specific road user. This can also apply to the case that merely positional information in respect of a road user is received, as it must be taken into consideration that possibly the receiving road user himself has not been detected by the detecting apparatus and at the same time possibly a road user actually detected by means of the detecting apparatus has not been detected for example by the sensors of the receiving road user. In this respect, received positional information or the positions ascertained from same can be understood as positional hypotheses, each of which describes a potential position of the receiving road user.

On the basis of the ego position ascertained by the road user himself as well as positional information, externally determined and provided to the receiving road user by means of V2X communication, as previously described, according to an aspect of the invention, by determining the distance it is ascertained whether the distance between the ego position and the position ascertained using the positional information is less than or equal to a threshold value. If this has happened, a correction of the ascertained ego position takes place using the received positional information. At this juncture it is assumed that if the threshold value criterion has been met, a position communicated with the V2X message and determined using the positional information refers not to another road user, but to the receiving road user himself. This conclusion can also be reached directly if only information in respect of one single road user is communicated per V2X.

This approach is based on the idea that the position of the infrastructure apparatus performing the capture is usually invariable and is very precisely known. The positions of the road user, ascertained by means of the items of detecting apparatus of the items of infrastructure apparatus, can thus—in particular compared with the detected ego position of a respective electronic device of a road user—be determined accurately and conveyed via the V2X messages for cooperative road user recognition. An advantage which thus results from an aspect of the invention is improving the positioning of a road user without having to provide a change of the underlying hardware merely for this purpose or having to provide considerably more cost-intensive resources.

Particularly precise results of an aspect of the invention are currently expected for the case that the road user remains detectable by means of sensors in the spatial vicinity of the detecting infrastructure apparatus, e.g. at a traffic light. The respective positional information relating to the road user who has remained stationary can thus be selected more efficiently due to the rate of change which is lower or essentially non-existent, and can be compared with an ascertained ego position.

According to an embodiment, either a number of V2X messages corresponding to the number of road users or a smaller number of V2X messages can be sent out by means of broadcast, wherein each V2X message can comprise positional information about a plurality of road users.

According to a development, in the case that the distance is greater than the threshold value, no correction of the ascertained ego position is undertaken using the positional information. At this juncture it is then assumed that the position of a road user received by means of V2X communication relates to another road user and therefore should not be used for a correction of the ego position. The positional information, the position of which does not meet the threshold value criterion and thus displays a greater distance, is interpreted as the respective position of a further road user and, according to a development, used for the originally considered purpose of cooperative road user detection, for example to prevent accidents. The position ascertained using the received positional information is instead, according to this embodiment, used as positional information of a further road user, in particular for evaluation by assistance systems of a receiving vehicle or automatic vehicle control system. From the received positional information in respect of a plurality of road users, thus merely the positional information for a correction is used which meet the named criterion, whereas further positional information which do not meet the named criterion are not used for a correction of the ego position.

Either a number of V2X messages corresponding to the number of road users and/or V2X messages comprising positional information in respect of a plurality of road users can be provided.

According to an embodiment of the method, the corrected ego position is provided as input value to a merging method for merging a plurality of input values to improve the positioning of the road user.

According to an embodiment, the correction is carried out in such a way that the ascertained ego position is replaced by the position ascertained using the positional information.

According to an embodiment, the correction is undertaken taking into consideration confidence information of the positional information. In particular, no correction takes place of the ascertained ego position using the positional information if the positional information or the position ascertained from same displays a lower accuracy in comparison with the ascertained ego position. For example, the accuracy using the confidence information or trust information in respect of the positional information can be measured, wherein such confidence information can likewise by covered by the received V2X message. According to an embodiment, it can also be provided to use the confidence information as a weighting factor for determining the ego position.

According to a development, the accuracy of the positioning can be improved from a plurality of ascertained positions received using the positional information affecting the electronic device. This can take place in particular using digital methods. At this juncture, the respective sender of a V2X message, comprising at least positional information at least of one of the plurality of positional hypotheses, can be an infrastructure apparatus or a further road user.

According to an embodiment, the positional information is used for a comparison with environment information which has been detected by means of at least one environment sensor of the electronic device.

According to an embodiment, a plausibility check of the ascertained ego position and/or of the position ascertained using the positional information and/or the corrected ego position is undertaken on the basis of a result of the comparison.

Advantageously, in particular before carrying out the correction using environment information, for example a check or a plausibility check can be carried out whether the corrected ego position resulting from the correction being carried out can be considered at all realistic.

For example, if all positions of road users ascertained using received positional information in terms of their distances can also be confirmed, by means of environment information, in respect of the corrected ego position, the corrected ego position can be regarded as having been subjected to a plausibility check.

According to a development, a correction of an ascertained ego alignment (heading) and/or an ascertained relative ego position of the electronic device using the positional information and/or environment information is undertaken on the basis of a result of the comparison.

According to a development, a check is carried out using the environment information whether a road user is within a distance which is less than or equal to a distance established by the threshold value. The received positional information is allocated to the electronic device or the road user if a road user is recognised to whom this applies, on the basis of a result of the comparison.

For example in the case in which the positional information of respective positions for a plurality of road users meets the distance criterion, then there are ambiguities about how the position is allocated to the electronic device. Therefore, according to a development of an aspect of the invention, in the case that there is a plurality of positional hypotheses within the distance threshold value, the threshold value can be designed to be adaptive and in particular reduced in a further iteration. This approach alone could, however, lead to incorrect results, if for example two road users are present positioned comparatively near one another, wherein one has the electronic device and merely the positional hypothesis which would be allocated to the other road user meets the criterion after reducing the threshold value. These cases could thus be solved using environment information which has been ascertained by means of at least one environment sensor.

According to this embodiment, a check can be carried out whether—apart from a road user who has the electronic device with him—a further road user remains in the area defined by the threshold value. If a further road user is recognised, an allocation of the received positional hypotheses is undertaken using the environment information. In so doing, ambiguities or erroneous allocations, and thus defective corrections of the ego position, can be prevented.

According to an embodiment, the position-detecting apparatus is designed to ascertain the ego position using information of a global satellite navigation system and/or movement information detected by sensors. For this, information can be used from a plurality of sources to improve the accuracy of the ego positional information. For this purpose, a coupled navigation by means of a fusion filter, for example a Kalman filter, can be achieved.

Expediently, the ego position is related to a reference point of the electronic device. This means that for example a GPS position ascertained by means of the position-detecting apparatus is converted into the position of a reference point of the electronic device. In a vehicle, this can for example be a centre of gravity of the vehicle. Thus it should be understood that the ego position in this sense can be used synonymously with the position of the reference point.

According to an embodiment, the V2X message is designed as a basic safety message (BSM), in particular according to SAE 32735, and/or as a collective perception message (CPM) and/or as a cooperative awareness message (CAM) and/or as a decentralized environmental notification message (DENM).

At ETSI, work is currently taking place to standardise a collective perception message (TR 103 562 and TS 103 324) which can include information in respect of a plurality of recognised objects.

According to an embodiment, the method further has the steps:
detecting a road user by means of a detection apparatus of an infrastructure apparatus,
ascertaining a position of the road user using information detection by means of the detecting apparatus,
broadcasting a vehicle-to-X (V2X) message for cooperative road user recognition, comprising positional information for ascertaining the position of the road user by means of a communication device of the infrastructure apparatus.

The V2X message can comprise the position or the positional information according to a development as absolute positional information, e.g. coordinates of a global satellite navigation system, and/or as relative positional information, e.g. with regard to the infrastructure apparatus being broadcast.

An aspect of the invention also describes an electronic device for ascertaining an ego position, comprising
a position-detecting apparatus for ascertaining an ego position of the electronic device,
a communication device for receiving a vehicle-to-X (V2X) message for cooperative road user recognition, comprising positional information for ascertaining a position of a road user, and
a computing apparatus for data processing, designed to ascertain a distance between the ascertained ego position and the position ascertained using the positional information and undertake a correction of the ascertained ego position using the positional information to form a corrected ego position if the distance is less than or equal to a threshold value.

According to an embodiment, the electronic device is configured to carry out a method according to at least one of the embodiments of the invention.

A processing unit can be any apparatus which is designed to process at least one of the named signals. For example, the processing unit can be a processor, a digital signal processor, a main processor ("central processing unit" (CPU)), a multi-purpose processor (MPP), a calculating engine in an ASIC or comparable means for data processing.

In a development of the stated electronic device, the indicated device has a memory and a processor. In so doing, the indicated method in the form of a computer program is stored in the memory and the processor is provided to carry out the method if the computer program is loaded from the memory into the processor.

According to a further aspect of the invention, a computer program comprises program code means to carry out all steps of one of the indicated methods if the computer program is carried out on a computer or the device.

According to a further aspect of the invention, a computer program product contains a program code which is stored on a computer-readable data carrier and which, when carried out on a data-processing device, carries out the stated method.

Furthermore, an aspect of the invention relates to the use of an embodiment of the electronic device according to an aspect of the invention in a vehicle or a portable computing device. Portable computing devices are in particular a smart phone, mobile phone, smart watch, tablet computer and/or personal computer.

Furthermore, an aspect of the invention describes a system for ascertaining the position of a road user, comprising:
an infrastructure apparatus, having at least one detecting apparatus for detecting road users and a communication device for vehicle-to-X (V2X) communication and
an electronic device according to at least one embodiment of the invention and which can be carried by a road user, wherein the system is configured to carry out an embodiment of the method according to the invention.

A vehicle within the meaning of this description can for example be a motor vehicle, in particular a passenger car, a commercial vehicle, a motorcycle, an electronic car or a hybrid car, a water vehicle or an aircraft.

BRIEF DESCRIPTION OF THE DRAWINGS

Some particularly advantageous embodiments of the invention are indicated in the dependent claims. Further preferred embodiments also result from the subsequent description of embodiment examples using Figures.

In schematic representation.

DETAILED DESCRIPTION OF THE PREFERRED EMBODIMENTS

Figure 1:
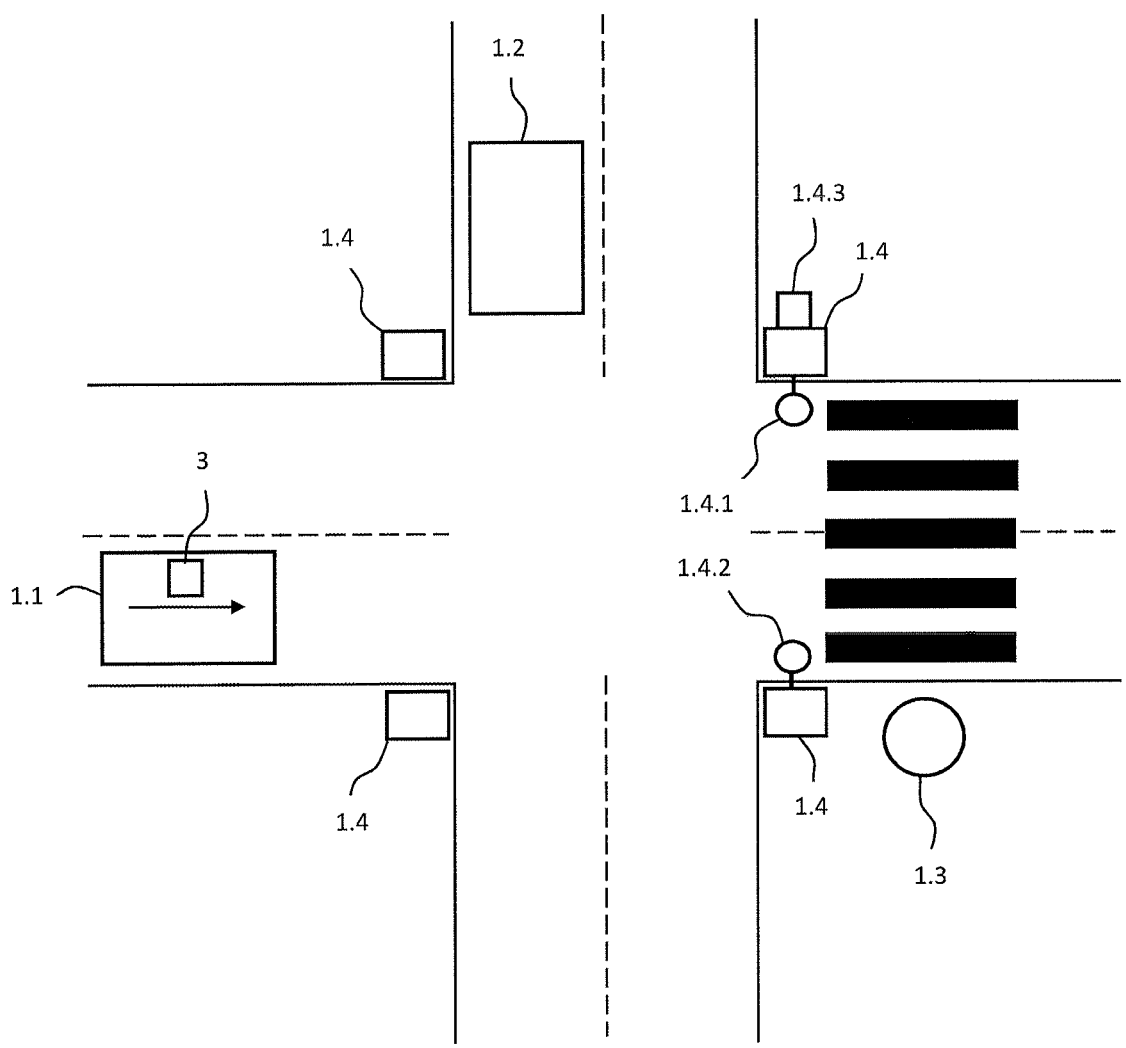
FIG. 1 shows an embodiment example of a system for ascertaining the position of a road user according to an aspect of the invention in the context of a traffic situation.

FIG. 1 shows a traffic situation for describing an embodiment example of the system according to an aspect of the invention. According to an example, a crossing situation with a plurality of road users 1.1, 1.2 and 1.3 and an intelligent infrastructure apparatus 1.4, according to the example a set of traffic lights, is shown. The road user 1.1 represents a vehicle which carries in it an electronic device 3 according to an embodiment of the invention or has one installed in the vehicle. The method which can be carried out by the electronic device as well as the electronic device itself are explained in more detail within the scope of the description of FIGS. 2 and 3. The vehicle 1.1 approaches the crossing in the direction shown by the arrow. The road user 1.2 likewise represents a vehicle waiting because of a stop signal displayed by the set of traffic lights. The road user 1.3 is a pedestrian in the crossing area.

The infrastructure apparatus 1.4 has cameras 1.4.1 and 1.4.2, represented in an exemplary manner, as detecting apparatuses for detecting the road users 1.1, 1.2 and 1.3. The infrastructure apparatus 1.4 further has a communication device 1.4.3 for vehicle-to-X (V2X) communication.

The infrastructure apparatus 1.4 is configured to detect the vehicles 1.1 and 1.2 as well as the pedestrian 1.3 by means of the cameras 1.4.1 and 1.4.2, and to ascertain their position. Furthermore, the infrastructure apparatus 1.4 is configured to send out a V2X message for cooperative road user recognition in broadcast mode by means of the communication device 1.4.3 for vehicle-to-X communication. The V2X message comprises at this juncture positional information for ascertaining the positions of the road users 1.1, 1.2 and 1.3. Alternatively, a number of V2X messages corresponding to the detected road users, each comprising the positional information of precisely one of the detected road users, can be sent out. The further procedure according to an embodiment of the method is described below using FIG. 2 or FIG. 3.

Figure 2:
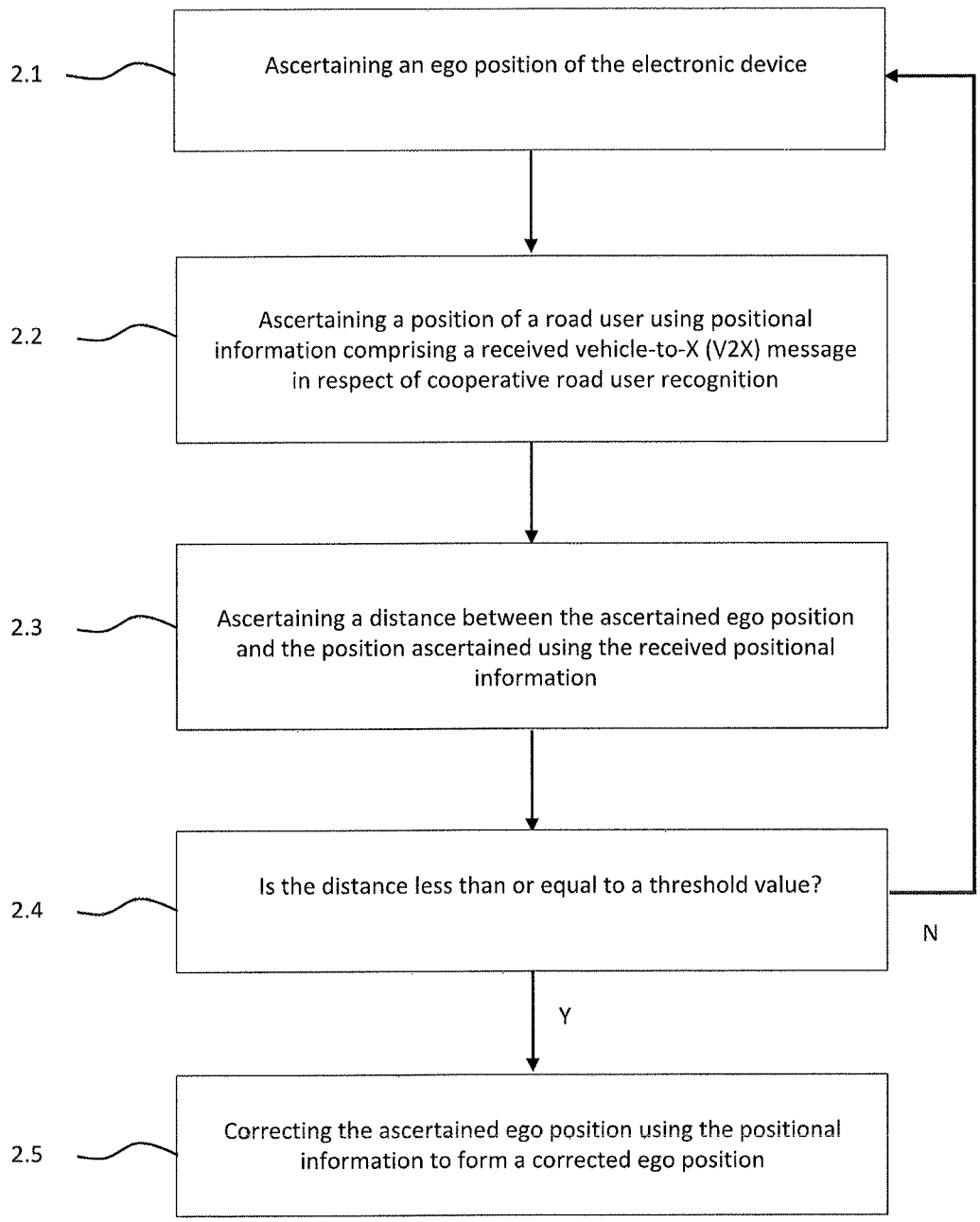
FIG. 2 shows an embodiment of a method for ascertaining an ego position of an electronic device according to an aspect of the invention.

FIG. 2 shows an embodiment of a method for ascertaining an ego position of an electronic device according to an aspect of the invention. At this juncture, in step 2.1, an ego position of the electronic device is ascertained by means of a position-detecting apparatus of the electronic device. In step 2.2, a position of a road user is ascertained using positional information comprising a received vehicle-to-X (V2X) message in respect of cooperative road user recognition, by means of a computing apparatus for processing the data of the electronic device. Expediently, at this juncture the V2X message has been received by means of a communication device of the electronic device and comprises the positional information for ascertaining a position of a road user.

In step 2.3, a distance between the ascertained ego position and the position ascertained using the received positional information is determined by a computing apparatus for processing data, wherein in step 2.4 a check is carried out whether the distance is less than or equal to a threshold value. If it is established in step 2.4 that the distance is less than or equal to the threshold value, represented in FIG. 2 by means of "Y", in step 2.5 the ascertained ego position is corrected to form a corrected ego position using the positional information. If, however, it is established in step 2.4 that the distance is not less than or equal to the threshold value, represented in FIG. 2 by means of "N", the method according to the example is started again at step 2.1. In particular if a received V2X message or a plurality of received V2X messages comprise(s) positional information relating to a plurality of positions and/or a plurality of road users, for example it can alternatively be provided that methods, proceeding from step 2.4, be repeated at steps 2.2 to 2.4 as frequently as necessary until all present received positional information has been evaluated or positional information has been found which meet the distance criterion. Subsequently, the method can be continued as already described, at step 2.1. However, consideration should be given to the ascertained ego position becoming increasingly inaccurate over time, in particular as the road user is in motion. The same applies to the received positional information, in particular for road users in motion.

Figure 3:
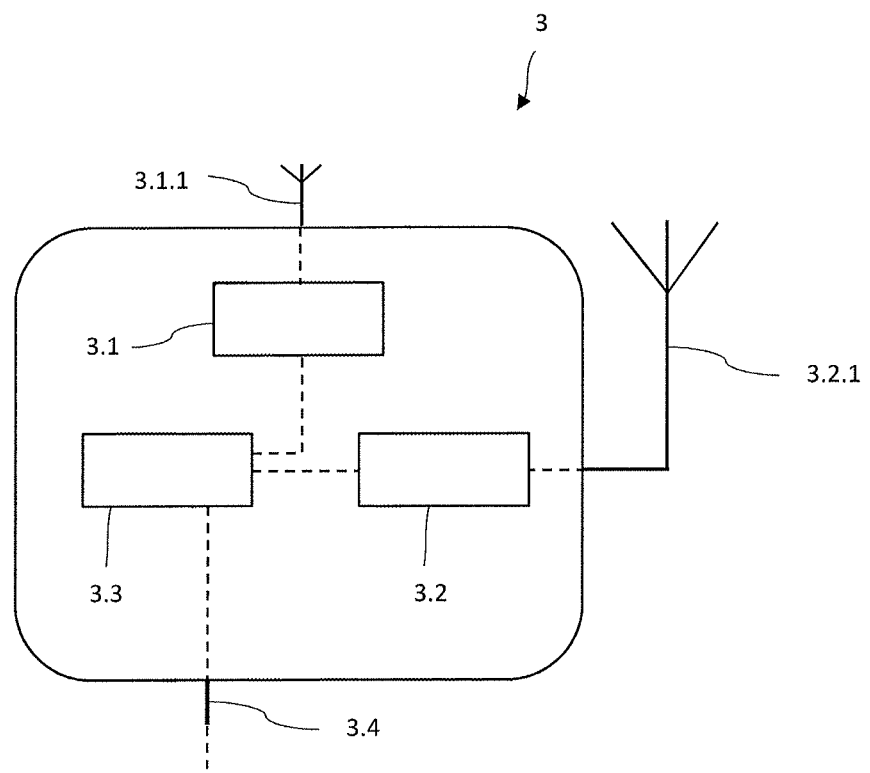
FIG. 3 shows an embodiment example of an electronic device for ascertaining an ego position according to an aspect of the invention.

FIG. 3 shows an embodiment example of an electronic device for ascertaining an ego position which is configured to carry out an embodiment of the method according to an aspect of the invention. Such an embodiment has been touched upon within the scope of the description of FIG. 2. The electronic device 3 comprises a position-detecting apparatus 3.1 which is configured for ascertaining an ego position of the electronic device, and inter alia for this has an antenna 3.1.1 for receiving satellite signals of a global satellite navigation system. The electronic device 3 further comprises a communication device 3.2 with an antenna 3.2.1 for receiving a vehicle-to-X message for cooperative road user recognition, comprising positional information for ascertaining a position of a road user, and a computing apparatus for data processing. By means of the computing apparatus 3.3, the electronic device is designed to ascertain a distance between the ascertained ego position and the position ascertained using the positional information and undertake a correction of the ascertained ego position using the positional information to form a corrected ego position if the distance is less than or equal to a threshold value. By means of a data-transmission apparatus 3.4, for example a data bus system, the computing apparatus 3.3 can provide the corrected ego position and/or the ego position of further electronic systems which use data in this regard, and which have been ascertained by means of the position-detecting apparatus.

For the eventuality that, in the course of the proceedings it is shown that a feature or group of features is not absolutely necessary, then the applicant is intending a formulation of an independent claim which no longer has the feature or group of features. This may for example relate to a subdivision of a claim present on the date of application, or a subdivision of a claim present on the date of application which has been restricted by further features. Such claims or combinations of features which are to be reworded are to be understood as being covered by the disclosure of this application.

It is furthermore to be pointed out that embodiments, features and variants of aspects of the invention which are described in the different embodiments or embodiment examples or shown in the Figures may be combined with one another in any combination. Individual features or groups of features may be exchanged for one another as desired. Combinations of features resulting from this are to be understood as being covered by the disclosure of this application.

References in dependent claims are not to be understood to mean disclaimers of the achievement of an independent objective protection for the features of the dependent claims which have been referenced. These features can be combined with other features as desired.

Features which are disclosed only in the description or features which are disclosed in the description or in the claims only in connection with other features can in principle be of original meaning essential to aspects of the invention. Therefore, they can be incorporated in the claims individually, distinct from the prior art.

Generally it is to be pointed out that vehicle-to-X communication is understood to mean in particular a direct communication between vehicles and/or between vehicles and items of infrastructure apparatus. For example, this can be vehicle-to-vehicle communication or vehicle-to-infrastructure communication. Where reference is made within the scope of this application to communication between vehicles, this can in principle take place for example within the scope of a vehicle-to-vehicle communication, which takes place typically without being facilitated by a mobile communications network or a similar external infrastructure and which therefore is to be distinct from other solutions which for example are built on a mobile communications network. For example, a vehicle-to-X communication can take place using the standards IEEE 802.11p or IEEE 1609.4 or 4G or 5G, in particular PC5 or "DirectLink". Vehicle-to-X communication can also be called C2X communication or V2X communication. The subdivisions can also be called C2C (car-to-car), V2V (vehicle-to-vehicle), C2I (car-to-infrastructure) or V2I (vehicle-to-infrastructure). However, aspects of the invention do not explicitly exclude vehicle-to-X communication facilitated via a mobile communications network.

The invention claimed is:

1. A method for ascertaining an ego position of an electronic device, comprising:
   ascertaining an ego position of the electronic device by a position-detecting apparatus of the electronic device,
   ascertaining, by a computing apparatus for processing the data of the electronic device, a position of a road user using positional information comprising a received vehicle-to-X message in respect of cooperative road user recognition,
   ascertaining, by the computing apparatus or a further computing apparatus for processing data, a distance between the ascertained ego position and the position ascertained using the received positional information,
   correcting the ascertained ego position using the positional information to form a corrected ego position if the distance is less than or equal to a threshold value.

2. The method according to claim 1, wherein no correction of the ascertained ego position is undertaken using the position ascertained using the received positional information, if the distance is greater than the threshold value.

3. The method according to claim 1, wherein the corrected ego position is provided, as the input value, to a merging method for merging a plurality of input values to improve the positioning of the road user.

4. The method according to claim 1, wherein correction is carried out in this way such that the ascertained ego position is replaced by the position ascertained using the received positional information.

5. The method according to claim 1, wherein the correction is undertaken while taking into consideration confidence information of the positional information.

6. The method according to claim 1, wherein no correction of the ascertained ego position is undertaken using the positional information if the positional information displays less accuracy, compared with the ascertained ego position.

7. The method according to claim 1, wherein the positional information is used for a comparison with environment information which has been detected by at least one environment sensor of the electronic device.

8. The method according to claim 1, wherein a plausibility check of the ascertained ego position and/or of the position ascertained using the positional information and/or the corrected ego position is undertaken on the basis of a result of the comparison.

9. The method according to claim 7, wherein a correction of an ascertained ego alignment (heading) and/or an ascertained relative ego position of the electronic device using the positional information and/or environment information is undertaken on the basis of a result of the comparison.

10. The method according to claim 7, wherein a check is carried out, using the environment information, whether a road user is at a distance which is less than or equal to a distance established by the threshold value and, on the basis of a result of the comparison, assigning the received positional information to the electronic device or the road user if a road user is identified to whom this applies.

11. The method according to claim 1, wherein the V2X message is designed as a basic safety message, according to SAE J2735, and/or as a collective perception message and/or as a cooperative awareness message and/or as a decentralized environmental notification message.

12. The method according to claim 1, further comprising:
    detecting a road user by a detection apparatus of an infrastructure apparatus,
    ascertaining a position of the road user using information detection by the detecting apparatus,
    broadcasting a vehicle-to-X message for cooperative road user recognition, comprising positional information for ascertaining the position of the road user by a communication device of the infrastructure apparatus.

13. An electronic device for ascertaining an ego position, comprising:
    a position-detecting apparatus for ascertaining an ego position of the electronic device,
    a communication device for receiving a vehicle-to-X message for cooperative road user recognition, comprising positional information for ascertaining a position of a road user, and
    a computing apparatus for data processing, designed to ascertain a distance between the ascertained ego position and the position ascertained using the positional information and undertake a correction of the ascertained ego position using the positional information to form a corrected ego position if the distance is less than or equal to a threshold value.

14. The electronic device according to claim 13, configured to carry out a method comprising:
    ascertaining an ego position of the electronic device by a position-detecting apparatus of the electronic device,
    ascertaining, by a computing apparatus for processing the data of the electronic device, a position of a road user using positional information comprising a received vehicle-to-X message in respect of cooperative road user recognition, ascertaining, by the computing apparatus or a further computing apparatus for processing data, a distance between the ascertained ego position and the position ascertained using the received positional information, correcting the ascertained ego position using the positional information to form a corrected ego position if the distance is less than or equal to a threshold value.

15. A use of the electronic device according to claim 13 in a vehicle or a portable computing device.

16. A system for ascertaining the position of a road user, comprising:

an infrastructure apparatus, having at least one detecting apparatus for detecting road users and a communication device for vehicle to X communication and an electronic device according to claim 13 which can be carried by a road user, wherein the system is configured to carry out a method comprising:

ascertaining an ego position of the electronic device by a position-detecting apparatus of the electronic device, ascertaining, by a computing apparatus for processing the data of the electronic device, a position of a road user using positional information comprising a received vehicle-to-X message in respect of cooperative road user recognition, ascertaining, by the computing apparatus or a further computing apparatus for processing data, a distance between the ascertained ego position and the position ascertained using the received positional information, and correcting the ascertained ego position using the positional information to form a corrected ego position if the distance is less than or equal to a threshold value.

17. The method according to claim 2, wherein the corrected ego position is provided, as the input value, to a merging method for merging a plurality of input values to improve the positioning of the road user.

18. The method according to claim 8, wherein a correction of an ascertained ego alignment (heading) and/or an ascertained relative ego position of the electronic device using the positional information and/or environment information is undertaken on the basis of a result of the comparison.

* * * * *